(12) United States Patent
Gil et al.

(10) Patent No.: US 8,551,302 B2
(45) Date of Patent: Oct. 8, 2013

(54) HYDROGEN GENERATING APPARATUS AND FUEL CELL POWER GENERATION SYSTEM CONTROLLING AMOUNT OF HYDROGEN GENERATION

(75) Inventors: Jae-Hyoung Gil, Seoul (KR); Jae-Hyuk Jang, Seongnam-si (KR); Arunabha Kundu, Suwon-si (KR); Sung-Han Kim, Suwon-si (KR); Kyoungsoo Chae, Suwon-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 1112 days.

(21) Appl. No.: 12/153,079

(22) Filed: May 13, 2008

(65) Prior Publication Data

US 2008/0213642 A1  Sep. 4, 2008

Related U.S. Application Data

(63) Continuation-in-part of application No. 11/812,656, filed on Jun. 20, 2007, now Pat. No. 7,879,205.

(30) Foreign Application Priority Data

Feb. 21, 2007  (KR) .......................... 10-2007-0017343

(51) Int. Cl.
*B23H 3/02* (2006.01)
*H01M 8/06* (2006.01)

(52) U.S. Cl.
USPC .................. 204/228.1; 204/228.3; 204/229.8; 429/416; 429/408; 429/427

(58) Field of Classification Search
USPC ......... 204/228.1, 228.3, 229.8; 429/408, 416, 429/427
See application file for complete search history.

(56) References Cited

U.S. PATENT DOCUMENTS

| | | | |
|---|---|---|---|
| 3,755,128 A | 8/1973 | Herwig | |
| 4,184,931 A | 1/1980 | Inoue | |
| 4,436,793 A | 3/1984 | Adlhart | |
| 4,798,661 A | 1/1989 | Meyer | |
| 5,431,796 A * | 7/1995 | Latella | ........................ 204/279 |
| 5,512,145 A * | 4/1996 | Hollenberg | ................... 205/628 |

(Continued)

FOREIGN PATENT DOCUMENTS

| CA | 2 510 371 | 11/2006 |
|---|---|---|
| JP | 5-299109 | 11/1993 |

(Continued)

OTHER PUBLICATIONS

Machine Translation of JP 2002-129372, May 2002.*

(Continued)

*Primary Examiner* — Patrick Ryan
*Assistant Examiner* — Julian Anthony

(57) ABSTRACT

Hydrogen generating apparatus that is capable of controlling the amount of hydrogen generation. The hydrogen generating apparatus has an electrolyzer, a first electrode, a second electrode, a switch, which is located between the first electrode and the second electrode, a flow rate meter, which measures an amount of hydrogen generation in the second electrode, and a switch controller, which receives a set value, compares the amount of hydrogen generation measured by the flow rate meter with the set value, and controls an on/off status of the switch. The amount of hydrogen generation can be controlled by use of on/off time and/or on/of frequency of the switch.

6 Claims, 17 Drawing Sheets

(56) References Cited

U.S. PATENT DOCUMENTS

| | | |
|---|---|---|
| 2004/0009392 A1 | 1/2004 | Petillo et al. |
| 2004/0229090 A1 | 11/2004 | Davis et al. |
| 2006/0088739 A1 | 4/2006 | Ovshinsky |
| 2007/0039815 A1 | 2/2007 | Bartel |
| 2008/0193810 A1 | 8/2008 | Gil et al. |
| 2008/0213642 A1 | 9/2008 | Gil et al. |
| 2008/0226954 A1 | 9/2008 | Gil et al. |
| 2008/0241610 A1 | 10/2008 | Gil et al. |

FOREIGN PATENT DOCUMENTS

| | | |
|---|---|---|
| JP | 6-260201 | 9/1994 |
| JP | 8-193287 | 7/1996 |
| JP | 2000-282277 | 10/2000 |
| JP | 2004-22386 | 1/2004 |
| JP | 2004-25053 | 1/2004 |
| JP | 2005-216828 | 8/2005 |
| JP | 2006-97061 | 4/2006 |
| WO | 2004/105171 A2 | 12/2004 |

OTHER PUBLICATIONS

Abstract of JP 2002-129372, May 2002.*
U.S. Appl. No. 12/929,233, filed Jan. 10, 2011, Jae-Hyoung Gil et al., Samsung-Electro Mechanics Co., Ltd.
Korean Office Action issued on Nov. 28, 2008 in corresponding Korean Patent Application 10-2007-0085142.
U.S. Office Action mailed Feb. 2, 2010 in related U.S. Appl. No. 11/812,656.
U.S. Office Action mailed Jul. 12, 2010 and issued in corresponding U.S. Appl. No. 11/812,656.
Extended European Search Report issued May 27, 2008 in corresponding European Patent Application No. 08250178.4.
U.S. Appl. No. 11/812,656, filed Jun. 20, 2007, Jae-Hyoung Gil et al., Samsung Electro-Mechanics Co., Ltd.
Korean Office Action issued May 28, 2009 in corresponding Korean Patent Application 10-2007-085142.
U.S Office Action mailed Oct. 14, 2009 in related U.S. Appl. No. 11/812,656.
Japanese Office Action issued Oct. 5, 2010 in corresponding Japanese Patent Application 2007-322641.
U.S. Patent Notice of Allowance, mailed Nov. 24, 2010, issued in corresponding U.S. Appl. No. 11/812,656.
Israeli Office Action issued Jun. 2, 2011 in corresponding Israeli Patent Application 188195.
U.S. Office Action dated Jun. 7, 2012 in copending U.S. Appl. No. 12/929,233.
U.S. Office Action issued in copending U.S. Appl. No. 12/929,233 mailed on Oct. 4, 2012.
Israel Office Action mailed Jan. 8, 2013 in corresponding Israel Patent Application No. 219,006.
European Office Action dated Apr. 8, 2010 issued in corresponding European Patent Application 08 250 178.4.

* cited by examiner

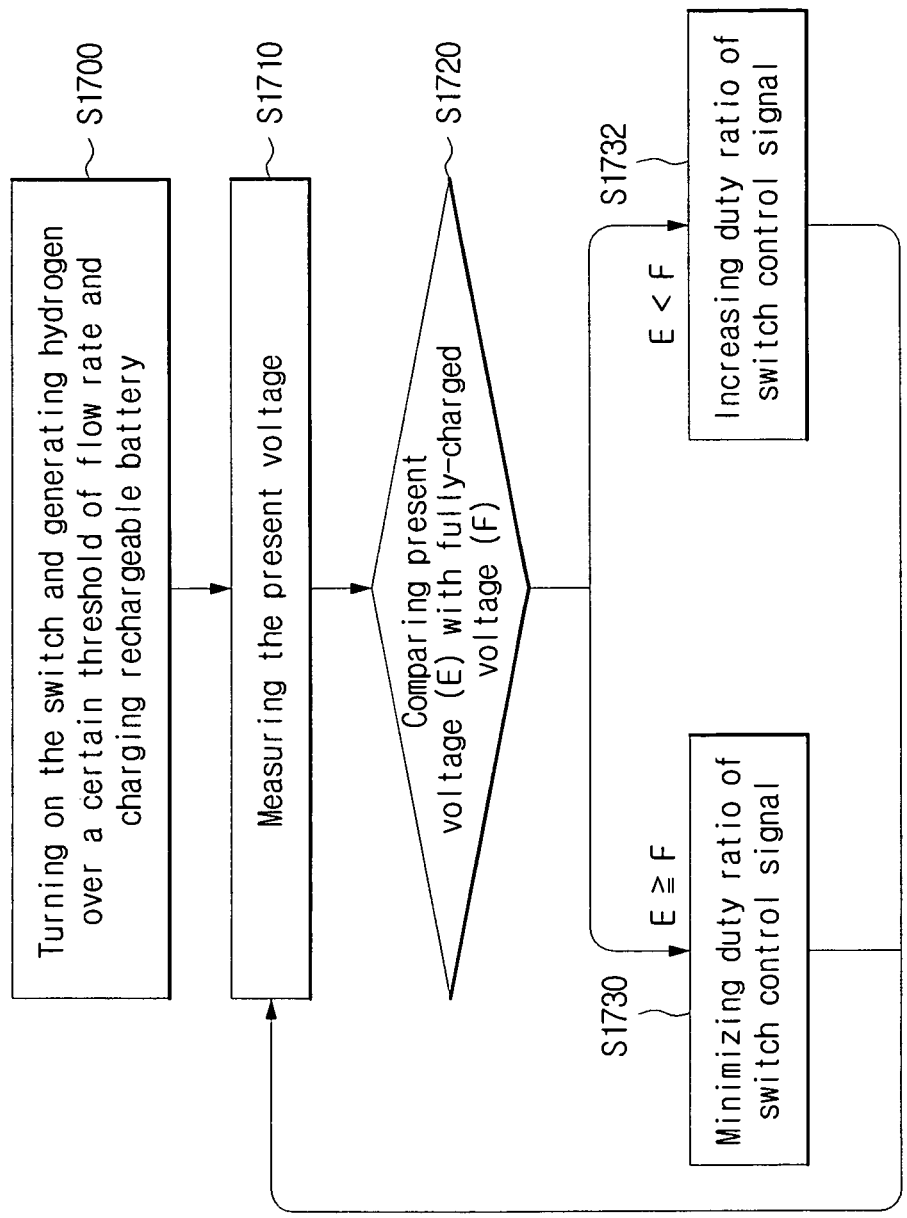

HYDROGEN GENERATING APPARATUS AND FUEL CELL POWER GENERATION SYSTEM CONTROLLING AMOUNT OF HYDROGEN GENERATION

CROSS-REFERENCE TO RELATED APPLICATIONS

This application is a continuation-in-part of U.S. patent application Ser. No. 11/812,656, filed on Jun. 20, 2007 now U.S. Pat. No. 7,879,205. And this application claims the benefit of Korean Patent Application No. 10-2007-0017343 filed with the Korean Intellectual Property Office on Feb. 21, 2007, the disclosure of which is incorporated herein by reference in its entirety.

BACKGROUND OF THE INVENTION

1. Field of the Invention

The present invention relates to a hydrogen generating apparatus, more particularly to a hydrogen generating apparatus that can control the amount of generation of hydrogen supplied to a fuel cell.

2. Background Art

A fuel cell refers to an energy conversion apparatus that directly converts chemical energy of a fuel (hydrogen, LNG, LPG, methanol, etc.) and air to electricity and/or heat by means of an electrochemical reaction. Unlike a conventional power generation technology that requires fuel combustion, steam generation, or a turbine or power generator, the fuel cell technology needs no combustion process or driving device, thereby boosting energy efficiency and curbing environmental problems.

FIG. 1 illustrates an operational architecture of a fuel cell.

Referring to FIG. 1, a fuel cell 100 is composed of an anode as a fuel pole 110 and a cathode as an air pole 130. The fuel pole 110 is provided with hydrogen molecules ($H_2$), and decomposes them into hydrogen ions ($H^+$) and electrons ($e^-$). The hydrogen ion ($H^+$) moves toward the air pole 130 via a membrane 120, which is an electrolyte layer. The electron moves through an external circuit 140 to generate an electric current. In the air pole 130, the hydrogen ions and the electrons are combined with oxygen molecules in the atmosphere, generating water molecules. The following chemical formulas represent the above chemical reactions occurring in the fuel cell 100.

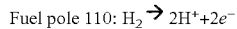

Fuel pole 110: $H_2 \rightarrow 2H^+ + 2e^-$

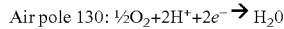

Air pole 130: $\frac{1}{2}O_2 + 2H^+ + 2e^- \rightarrow H_2O$

Overall reaction: $H_2 + \frac{1}{2}O_2 \rightarrow H_2O$   CHEMICAL FORMULA 1

In short, the fuel cell 100 functions as a battery by supplying the electric current, generated due to the flowing of the decomposed electrons, to the external circuit 140. Such a fuel cell 100 hardly emits an atmospheric pollutant such as Sox and NOx and makes little noise and vibration.

Meanwhile, in order to produce electrons in the fuel pole 110, the fuel cell 100 necessitates a hydrogen generating apparatus that can change a common fuel to hydrogen gas.

A hydrogen storage tank, generally known as a hydrogen generating apparatus, however, occupies a large space and should be kept with care.

Moreover, as a portable electronic device, such as a mobile phone and a notebook computer, requires a large capacity of power, it is necessary that the fuel cell have a large capacity and perform high performance while it is small.

In order to meet the above needs, methanol or formic acid, permitted to be brought into an airplane by International Civil Aviation Organization (ICAO), is used for fuel reforming, or methanol, ethanol, or formic acid is directly used as a fuel for the fuel cell.

However, the former case requires a high reforming temperature, has a complicated system, consumes driving power, and contains impurities (e.g., $CO_2$ and CO) in addition to pure hydrogen. The latter case deteriorates power density due to a low rate of a chemical reaction in the anode and a cross-over of hydrocarbon through the membrane.

SUMMARY OF THE INVENTION

The present invention provides a hydrogen generating apparatus, a fuel cell power generation system, a method of controlling the quantity of hydrogen generation, and a recorded medium recorded with a program performing the method that can generate pure hydrogen at room temperature through an electrochemical reaction.

The present invention also provides a hydrogen generating apparatus, a fuel cell power generation system, a method of controlling the quantity of hydrogen generation, and a recorded medium recorded with a program performing the method that can control the quantity of hydrogen generation without a separate BOP (Balance of Plant) unit while maintaining a simple structure.

The present invention also provides a hydrogen generating apparatus, a fuel cell power generation system, a method of controlling the quantity of hydrogen generation, and a recorded medium recorded with a program performing the method that are economical and eco-friendly.

The present invention also provides a hydrogen generating apparatus, a fuel cell power generation system, a method of controlling the quantity of hydrogen generation, and a recorded medium recorded with a program performing the method that can control the quantity of hydrogen generation by use of On/Off time and/or On/Off frequency of a switch.

Moreover, the present invention provides a hydrogen generating apparatus, a fuel cell power generation system, a method of controlling the quantity of hydrogen generation, and a recorded medium recorded with a program performing the method that can prevent waste or risk of leaking surplus hydrogen in the air simply by turning on the switch and reduce the noise and power consumption by not using a gas pump or a liquid pump.

Moreover, the present invention provides a hydrogen generating apparatus that can control the amount of generation by use of feedback control according to the demand from a load connected to the fuel cell.

An aspect of the present invention features a hydrogen generating apparatus that is capable of controlling the amount of hydrogen generation.

The hydrogen generating apparatus in accordance with an embodiment of the present invention includes an electrolyzer, which is filled with an aqueous electrolyte solution containing hydrogen ions, a first electrode, which is accommodated in the electrolyzer, is submerged in the aqueous electrolyte solution, and generates electrons, a second electrode, which is accommodated in the electrolyzer, is submerged in the aqueous electrolyte solution, and receives the electrons to generate hydrogen, a switch, which is located between the first electrode and the second electrode, a flow rate meter, which measures an amount of hydrogen generation in the second electrode, and a switch controller, which receives a set value, compares the amount of hydrogen generation measured by the flow rate meter with the set value, and controls an on/off status of the switch.

The switch controller can be inputted with the set value directly from a user through an input device. The hydrogen generating apparatus can be coupled to a fuel cell and supplies hydrogen, and the switch controller can be inputted with the set value in accordance with an amount of hydrogen generation that is required by the fuel cell.

The metal forming the first electrode can have a higher ionization tendency than a metal forming the second electrode.

The flow rate meter can measure the amount of hydrogen generation in units of flowrate. The switch controller can generate and output a switch control signal turning the switch on and off, and the switch controller can determine an on/off ratio of the switch within one cycle by varying a duty ratio of the switch control signal.

The switch controller can control a fluctuation in the amount of hydrogen generation by varying an on/off frequency of the switch control signal. The switch controller can compare the set value with the measured amount of hydrogen generation, and can increase the duty ratio if the amount of hydrogen generation is smaller than the set value, reduce the duty ratio if the amount of hydrogen generation is greater than the set value, and maintain the duty ratio if the amount of hydrogen generation is equal to the set value. The set value includes an upper limit and a lower limit, and the switch controller can compare the set value with the measured amount of hydrogen generation, and can increase the duty ratio if the amount of hydrogen generation is smaller than the lower limit, reduce the duty ratio if the amount of hydrogen generation is greater than the upper limit, and maintain the duty ratio if the amount of hydrogen generation is between the lower limit and the upper limit.

Another aspect of the present invention features a fuel cell power generation system including a hydrogen generating apparatus that is capable of controlling the amount of hydrogen generation.

The fuel cell power generation system in accordance with an embodiment of the present invention has a hydrogen generating apparatus, which controls an amount of hydrogen generation by controlling an on/off status of a switch connected between electrodes, a fuel cell, which is supplied with hydrogen generated by the hydrogen generating apparatus and produces a direct current by converting chemical energy of the hydrogen to electrical energy, and a load, which is provided the electric energy and performing a predetermined operation.

The hydrogen generating apparatus can include an electrolyzer, which is filled with an aqueous electrolyte solution containing hydrogen ions, a first electrode, which is accommodated in the electrolyzer, is submerged in the aqueous electrolyte solution, and generates electrons, a second electrode, which is accommodated in the electrolyzer, is submerged in the aqueous electrolyte solution, and receives the electrons to generate hydrogen, a switch, which is located between the first electrode and the second electrode, a switch controller, which received a demanded power from the load, measuring an output of the fuel cell, compares the demanded power with the output, and controls an on/off status of the switch. The metal forming the first electrode can have a higher ionization tendency than a metal forming the second electrode.

The switch controller can generate and output a switch control signal turning the switch on and off, and the switch controller can determine an on/off ratio of the switch within one cycle by varying a duty ratio of the switch control signal. The switch controller can control a fluctuation in the amount of hydrogen generation by varying an on/off frequency of the switch control signal. The switch controller can compare the demanded power with the output, and can reduce the duty ratio if the output is greater than the demanded power, increase the duty ratio if the output is smaller than the demanded power, and maintain the duty ratio if the output is equal to the demanded power.

The fuel cell power generation system in accordance with an embodiment of the present invention further comprises a rechargeable battery, being coupled between the fuel cell and the load, being charged by the electric energy from the fuel cell, and providing the charged electric energy when the load needs.

The hydrogen generating apparatus can include an electrolyzer, which is filled with an aqueous electrolyte solution containing hydrogen ions, a first electrode, which is accommodated in the electrolyzer, submerged in the aqueous electrolyte solution, and generating electrons, a second electrode, which is accommodated in the electrolyzer, submerged in the aqueous electrolyte solution, receiving the electrons to generate hydrogen, a switch, which is located between the first electrode and the second electrode, a switch controller, which measures present voltage of the rechargeable battery, compares a fully-charged voltage with the present voltage, and controlling an on/off status of the switch. The metal forming the first electrode can have a higher ionization tendency than a metal forming the second electrode.

The switch controller generates and outputs a switch control signal turning the switch on and off, and the switch controller determines an on/off ratio of the switch within one cycle by varying a duty ratio of the switch control signal. And the switch controller controls a fluctuation in the amount of hydrogen generation by varying an on/off frequency of the switch control signal.

The switch controller compares the present voltage with the fully-charged voltage, and increases the duty ratio if the present voltage is smaller than the fully-charged voltage, and minimizes the duty ratio if the present voltage is equal to or greater than the fully-charged voltage.

The meter can be an output meter that measures an output of the fuel cell in units of watt (W), volt (V), ampere (A), ohm ($\Omega$) and a combination thereof. The switch controller can control a fluctuation in the output of the fuel cell by varying an on/off frequency of the switch control signal. The switch controller can compare the set value with the measured output of the fuel cell, and can increase the duty ratio if the output of the fuel cell is smaller than the set value, reduce the duty ratio if the output of the fuel cell is greater than the set value, and maintain the duty ratio if the output of the fuel cell is equal to the set value. The set value can include an upper limit and a lower limit, and the switch controller can compare the set value with the measured output of the fuel cell, and can increase the duty ratio if the output of the fuel cell is smaller than the lower limit, reduce the duty ratio if the output of the fuel cell is greater than the upper limit, and maintain the duty ratio if the output of the fuel cell is between the lower limit and the upper limit.

Another aspect of the present invention features a method of controlling an amount of hydrogen generation in a hydrogen generating apparatus controlling an amount of hydrogen generation by controlling an on/off status of a switch located between electrodes.

The method of controlling an amount of hydrogen generation in accordance with an embodiment of the present invention includes the steps of being inputted with a set value;

comparing a measured amount of hydrogen generation and the set value; and increasing a duty ratio of a switch control signal if the amount of hydrogen generation is smaller than the set value, reducing the duty ratio of the switch control signal if the amount of hydrogen generation is greater than the set value, and maintaining the duty ratio of the switch control signal if the amount of hydrogen generation is equal to the set value, in which the switch control signal controls the on/off status of the switch within one cycle in accordance with the duty ratio.

The method of controlling an amount of hydrogen generation in accordance with another embodiment of the present invention includes the steps of being inputted with an upper value and a lower value; comparing a measured amount of hydrogen generation with the upper value and the lower value; and increasing a duty ratio of a switch control signal if the amount of hydrogen generation is smaller than the lower value, reducing the duty ratio of the switch control signal if the amount of hydrogen generation is greater than the upper value, and maintaining the duty ratio of the switch control signal if the amount of hydrogen generation is between the lower value and the upper value, in which the switch control signal controls the on/off status of the switch within one cycle in accordance with the duty ratio.

The method of controlling an amount of hydrogen generation in accordance with another embodiment of the present invention, which is controlling an amount of hydrogen generation by controlling an on/off status of a switch located between electrodes, measures an output of the fuel cell, and receiving a demanded power from the load, compares the output with the demanded power, and reduces a duty ratio of switch control signal if the output is greater than the demanded power, increasing the duty ratio of switch control signal if the output is smaller than the demanded power, and maintains the duty ratio of switch control signal if the output is equal to the demanded power, in which the switch control signal controls the on/off status of the switch within one cycle in accordance with the duty ratio.

The method of controlling an amount of hydrogen generation in accordance with another embodiment of the present invention, which is controlling an amount of hydrogen generation by controlling an on/off status of a switch located between electrodes, measures a present voltage of the rechargeable battery, compares the present voltage with a fully-charged voltage, and increasing a duty ratio of switch control signal if the present voltage is smaller than the fully-charged voltage, and minimizes the duty ratio of switch control signal if the present voltage is equal to or greater than the fully-charged voltage, in which the switch control signal controls the on/off status of the switch within one cycle in accordance with the duty ratio.

BRIEF DESCRIPTION OF THE DRAWINGS

These and other features, aspects and advantages of the present invention will become better understood with regard to the following description, appended claims and accompanying drawings where:

FIG. 8 shows a graph of the amount of hydrogen generation, expressed in units of flow rate, when the switch is turned on;

FIG. 17 shows a flowchart of a method of controlling the quantity of hydrogen generation in a hydrogen generating apparatus in accordance with another embodiment of the present invention.

DESCRIPTION OF THE EMBODIMENTS

Figure 1:
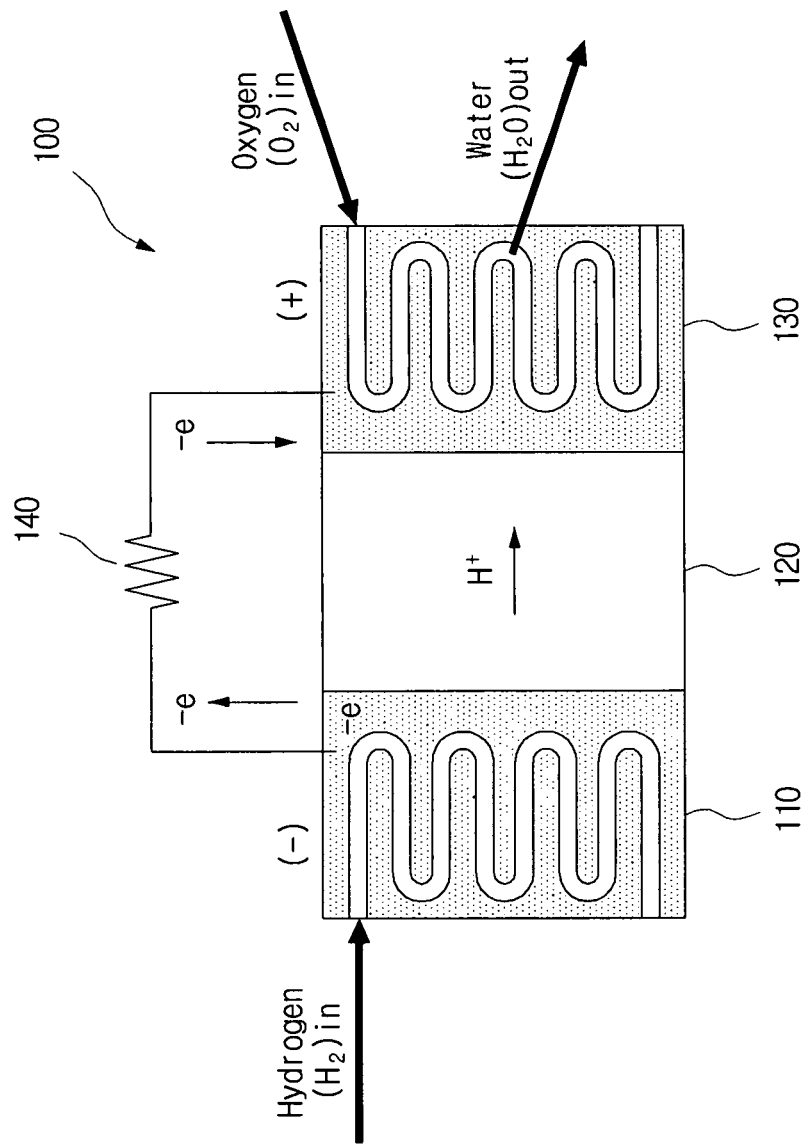
FIG. 1 illustrates an operational architecture of a fuel cell.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, certain embodiments will be described in detail with reference to the accompanying drawings. Identical or corresponding elements will be given the same reference numerals, regardless of the figure number, and any redundant description of the identical or corresponding elements will not be repeated.

Figure 2:
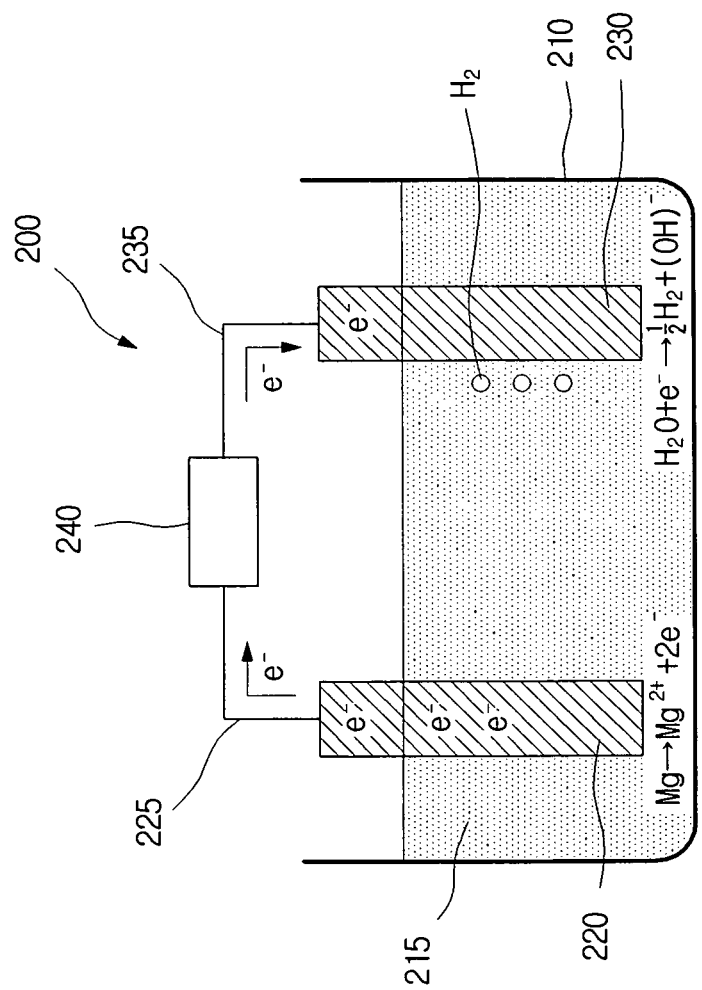
FIG. 2 shows a sectional view of a hydrogen generating apparatus in accordance with an embodiment of the present invention.

FIG. 2 is a sectional view of a hydrogen generating apparatus in accordance with an embodiment of the present invention.

A hydrogen generating apparatus 200 includes an electrolyzer 210, a first electrode 220, a second electrode 230 and a control unit 240. For the convenience of description and understanding, it will be presumed below that the first electrode 220 is composed of magnesium (Mg) and the second electrode 230 is composed of stainless steel.

The electrolyzer 210 is filled with an aqueous electrolyte solution 215. The aqueous electrolyte solution 215 contains hydrogen ions, which are used by the hydrogen generating apparatus 200 to generate hydrogen gas.

Examples of the electrolyte for the aqueous electrolyte solution 215 are LiCl, KCl, NaCl, $KNO_3$, $NaNO_3$, $CaCl_2$, $MgCl_2$, $K_2SO_4$, $Na_2SO_4$, $MgSO_4$, AgCl, or the like.

The electrolyzer 210 accommodates the first electrode 220 and the second electrode 230, the entirety or portions of which are submerged in the electrolyte solution 215.

The first electrode 220 is an active electrode, where the magnesium (Mg) is oxidized to magnesium ions ($Mg^{2+}$), releasing electrons due to the difference in ionization energies of magnesium and water. The released electrons move to the second electrode 230 through a first electric wire 225, the control unit 240 and a second electric wire 235.

The second electrode 230 is an inactive electrode, where the water molecules receive the electrons moved from the first electrode 220 and then are decomposed into the hydrogen molecules.

The above chemical reactions can be represented as the following chemical formula 2:

First electrode 220: 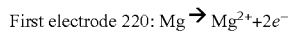

Second electrode 230: 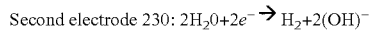

Overall reaction: 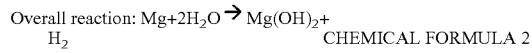

CHEMICAL FORMULA 2

The reaction rate and the efficiency of the chemical reaction depend on various factors, including the area of the first electrode 220 and/or the second electrode 230, the concentration of the aqueous electrolyte solution 215, the type of the aqueous electrolyte solution 215, the number of the first electrode 220 and/or the second electrode 230, the method of connecting the first electrode 220 and the second electrode 230, the electric resistance between the first electrode 220 and the second electrode 230.

Changing any of the above factors affects the amount of electric current (that is, the amount of electrons) flowing between the first electrode 220 and the second electrode 230, thereby altering the reaction rate of the electrochemical reaction shown in CHEMICAL FORMULA 2, which in turn changes the amount of hydrogen generated in the second electrode 230.

Therefore, the amount of the hydrogen generated in the second electrode 230 can be controlled by controlling the amount of the electric current that flows between the first electrode 220 and the second electrode 230. Faraday's law explains this as shown in MATHEMATICAL FORMULA 1 below.

MATHEMATICAL FORMULA 1

$$N_{hydrogen} = \frac{i}{nE}$$

$$N_{hydrogen} = \frac{i}{2 \times 96485} \text{(mol)}$$

$$V_{hydrogen} = \frac{i}{2 \times 96485} \times 60 \times 22400 \text{(ml/min)} = 7 \times i \text{(ml/min)}$$

Where $N_{hydrogen}$ is the amount of hydrogen generated per second (mol/s), $V_{hydrogen}$ is the volume of hydrogen generated per minute (ml/min), i is the electric current (C/s), n is the number of the reacting electrons, and E is the electron charge per mole (C/mol).

In the case of the above CHEMICAL FORMULA 2, n has a value of 2 since two electrons react at the second electrode 230, and E has a value of −96,485 C/mol.

The volume of hydrogen generated per minute can be calculated by multiplying the time (60 seconds) and the molar volume of hydrogen (22400 ml) to the amount of hydrogen generated per second.

For example, in the case that the fuel cell is used in a 2 W system, and it is assumed that the fuel cell is running a voltage of 0.6V at room temperature and that a hydrogen usage ratio is 60%, it takes 42 ml/mol of hydrogen and 6 A of electric current. In the case that the fuel cell is used in a 5 W system, it takes 105 ml/mol of hydrogen and 15 A of electric current.

The hydrogen generating apparatus 200 can meet the variable hydrogen demand of the fuel cell connected thereto by controlling the amount of electric current flowing through the first electric wire 225, connected to the first electrode 220, and the second electric wire 235, connected to the second electrode 230.

However, most of the factors that determine the rate of the hydrogen generation reaction occurring in the second electrode of the hydrogen generating apparatus 200, except the electric resistance between the first electrode 220 and the second electrode 230, are hardly changeable once the hydrogen generating apparatus 200 is manufactured.

Therefore, the hydrogen generating apparatus 200 according to this embodiment of the present invention has the control unit 240 disposed between the first electric wire 225 and the second electric wire 235, which connect the first electrode 220 and the second electrode 230, in order to regulate the electric resistance between the first electrode 220 and the second electrode 230.

Thus, the hydrogen generating apparatus 200 controls the electric resistance between the first electrode 220 and the second electrode 230, that is, the amount of the electric current flowing therebetween, thereby generating as much hydrogen as needed by the fuel cell.

The first electrode 220 can be also composed of a metal having a relatively high ionization tendency, such as iron (Fe), aluminum (Al), zinc (Zn), or the like. The second electrode 230 can be also composed of a metal having a relatively low ionization tendency compared to the metal of the first electrode 220, such as platinum (Pt), aluminum (Al), copper (Cu), gold (Au), silver (Ag), iron (Fe), or the like.

The control unit 240 controls a transfer rate, that is, the amount of electric current, at which electrons generated in the first electrode 220 are transferred to the second electrode 230.

The control unit 240 receives information on power demanded for load coupled to the fuel cell and, according to the information, maintains, or increases or reduces the amount of electrons flowing from the first electrode 220 to the second electrode 230.

Figure 3:
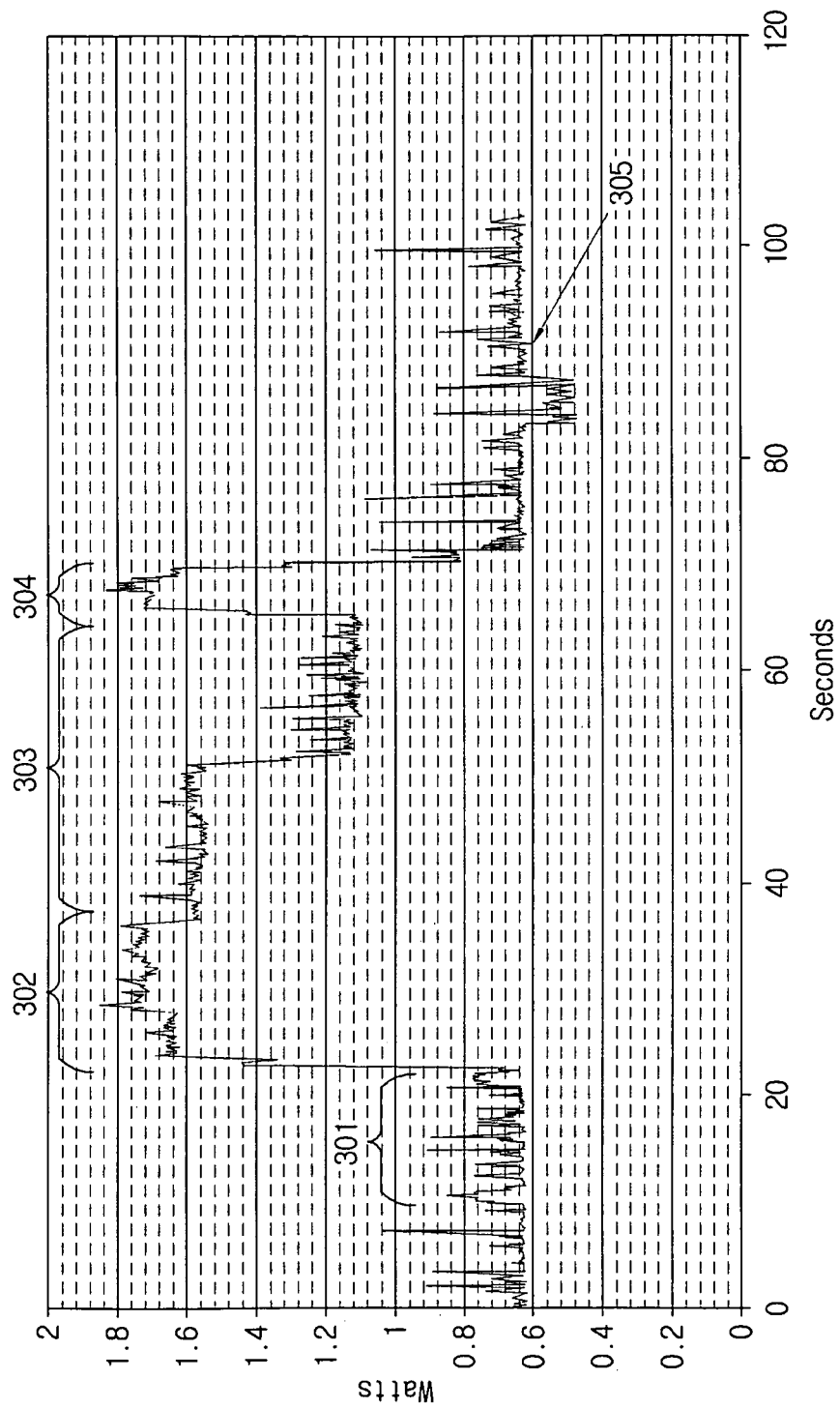
FIG. 3 is a graph showing the power consumption of mobile phone.

For example, it will be described with reference to the power consumption of mobile phone as shown in FIG. 3. FIG. 3 is a graph showing the power consumption of mobile phone.

The modes of mobile phone depend on the currently-working key or menu selection, and the power consumption also varies accordingly.

Range 301 indicates the situation of requesting a call by dialing, range 302 indicates the situation of waiting a receiver's response with hearing of ring-back tone, range 303 indicates the situation of talking over mobile phone, range 304 indicates the situation of ending a call, and range 305 indicates the situation of sending a call rate message. Since mobile phone operates different components in each of situations, the power consumption varies frequently as shown in FIG. 3.

Therefore controller 240 receives feedback on power demanded for the load such as mobile phone as shown in FIG. 3, and controls to generate hydrogen as much as being demanded so to provide power enough to the load coupled to the fuel cell.

The hydrogen generating apparatus may further comprise an input device for user to manually input the demanded amount of power or hydrogen.

The hydrogen generating apparatus of the present invention can have a plurality of the first electrodes 220 and/or the second electrodes 230. In the case that a plural number of the first electrode 220 and/or the second electrode 230 are disposed, it can take a shorter time to generate the demanded amount of hydrogen since the hydrogen generating apparatus 200 can generate more hydrogen per unit time.

Figure 4:
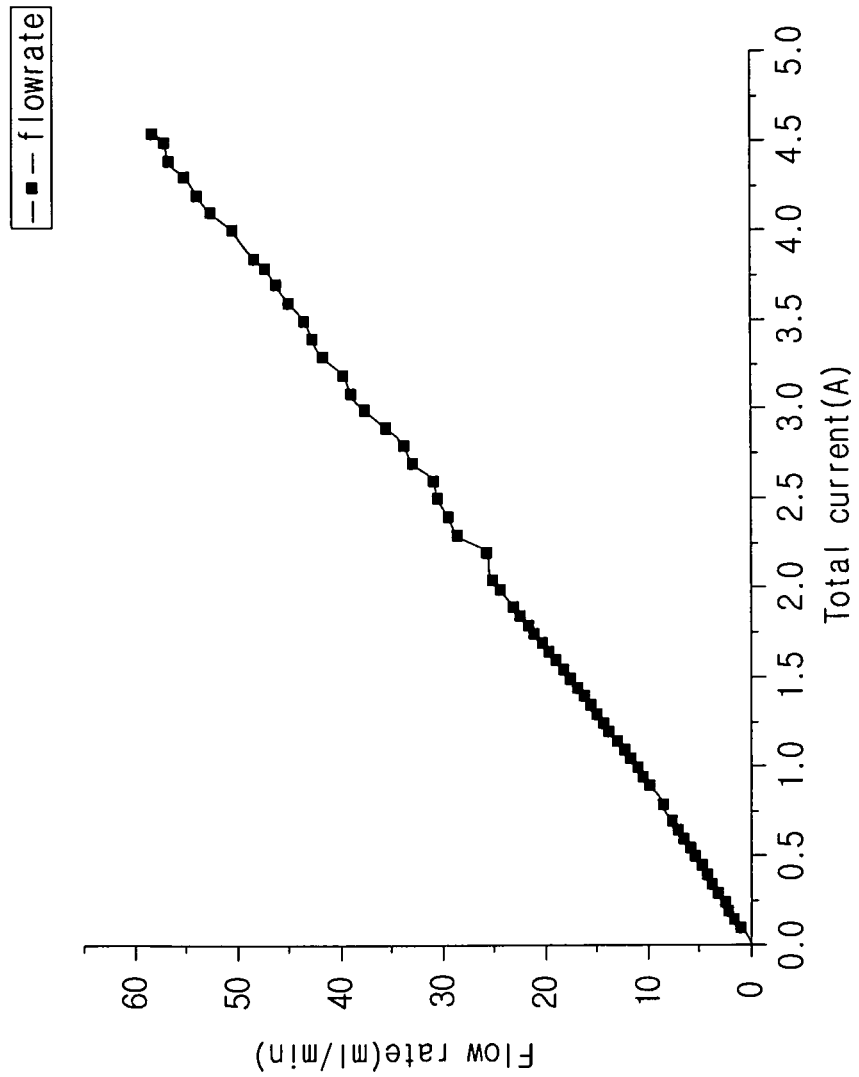
FIG. 4 is a graph showing how the amount of electric current between a first electrode and a second electrode and the amount of generated hydrogen are related in a hydrogen generating apparatus in accordance with an embodiment of the present invention.

FIG. 4 is a graph showing how the amount of electric current flowing between the first electrode 220 and the second electrode 230 is related to the volume of hydrogen generated on the second electrode 230. Here, it should be noted that the volume of hydrogen is shown in flow-rate measured per minute, because not the total volume of generated hydrogen but the flow-rate of hydrogen is significant to a fuel cell.

An experiment for FIG. 3 was conducted under the following conditions:

First electrode 220: Magnesium (Mg)

Second electrode 230: Stainless steel

Distance between the electrodes: 3 mm

Ingredients and concentration of electrolyte: 30 wt % KCl

Number of the electrodes: Magnesium 3 each, Stainless steel 3 each

Electrode connecting method: Serial

Volume of aqueous electrolyte solution: 60 cc (excessive condition)

Size of the electrode: 24 mm×85 mm×1 mm

The above conditions were used for every graph referred to in describing the present invention.

FIG. 4 shows a greater flow rate of the hydrogen than a theoretical value based on MATHEMATICAL FORMULA 1, due to an interaction of the three pairs of electrodes.

Nevertheless, it is verified from FIG. 4 that the flow-rate of hydrogen is correlated with the amount of electric current between the first electrode 220 and the second electrode 230. Also, the graph shows an almost linear relation between the flow-rate and the amount of the electric current, which agrees with the MATHEMATICAL FORMULA 1.

Figure 5:
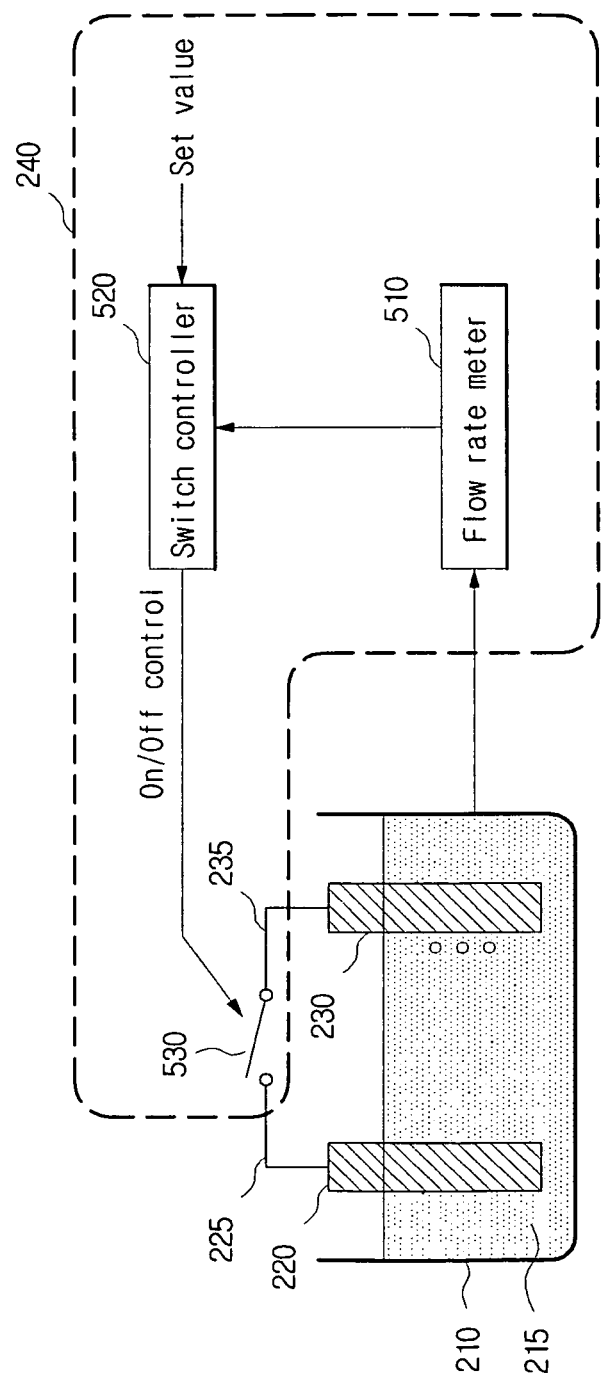
FIG. 5 shows a block diagram of a control unit of a hydrogen generating apparatus in accordance with an embodiment of the present invention.

FIG. 5 is a block diagram of the control unit 240 of the hydrogen generating apparatus in accordance with an embodiment of the present invention.

The control unit 240 comprises a flow rate meter 510, a switch controller 520 and a switch 530.

The flow rate meter 510 measures the amount of hydrogen, in units of flow rate, generated from the second electrode 230 of the hydrogen generating apparatus. As described above, in order to use the hydrogen generating apparatus 200 in accordance with the present invention by coupling to a fuel cell, a certain amount of hydrogen generation, not a total quantity of hydrogen generation, should be maintained, and thus it is required that the amount of hydrogen generation be measured in units of ml/min. Of course, it is possible to use other measurement units as long as the unit is capable of measuring the flow rate.

The switch controller 520 is inputted with a set value, which is related to the amount of hydrogen generation. The hydrogen generating apparatus 200 is disposed with a separate input device (not shown), through which the set value can be inputted by the user. The required amount of output (i.e. electric power, voltage, current, impedance, and a combination thereof) or hydrogen generation may be inputted by a fuel cell that is coupled to the hydrogen generating apparatus 200. In the latter case, the fuel cell may be separately equipped with a hydrogen requiring unit for inputting the amount of output or hydrogen generation that is needed by the hydrogen generating apparatus 200.

The switch controller 520 compares the inputted set value with the amount of hydrogen generation measured by the flow rate meter 510. If the amount of generated hydrogen is smaller than the set value, the switch 530 is controlled to increase the amount of hydrogen generation, and if the amount of generated hydrogen is greater than the set value, the switch 530 is controlled to reduce the amount of hydrogen generation. It is assumed that the switch 530 is controlled by a switch control signal such that the switch controller 520 can turn the switch 530 on or off.

The switch is disposed between the first electrode 220 and the second electrode 230. Electrons generated in the first electrode 220 is transferred to the second electrode 230 if the switch 530 is turned on, and the electrons generated in the first electrode 220 is not transferred to the second electrode 230 if the switch 530 is turned off.

That is, the control unit 240 controls the amount of hydrogen generation, using the switch 530 to control whether the electrons are to be transferred from the first electrode 220 to the second electrode 230.

Figure 6:
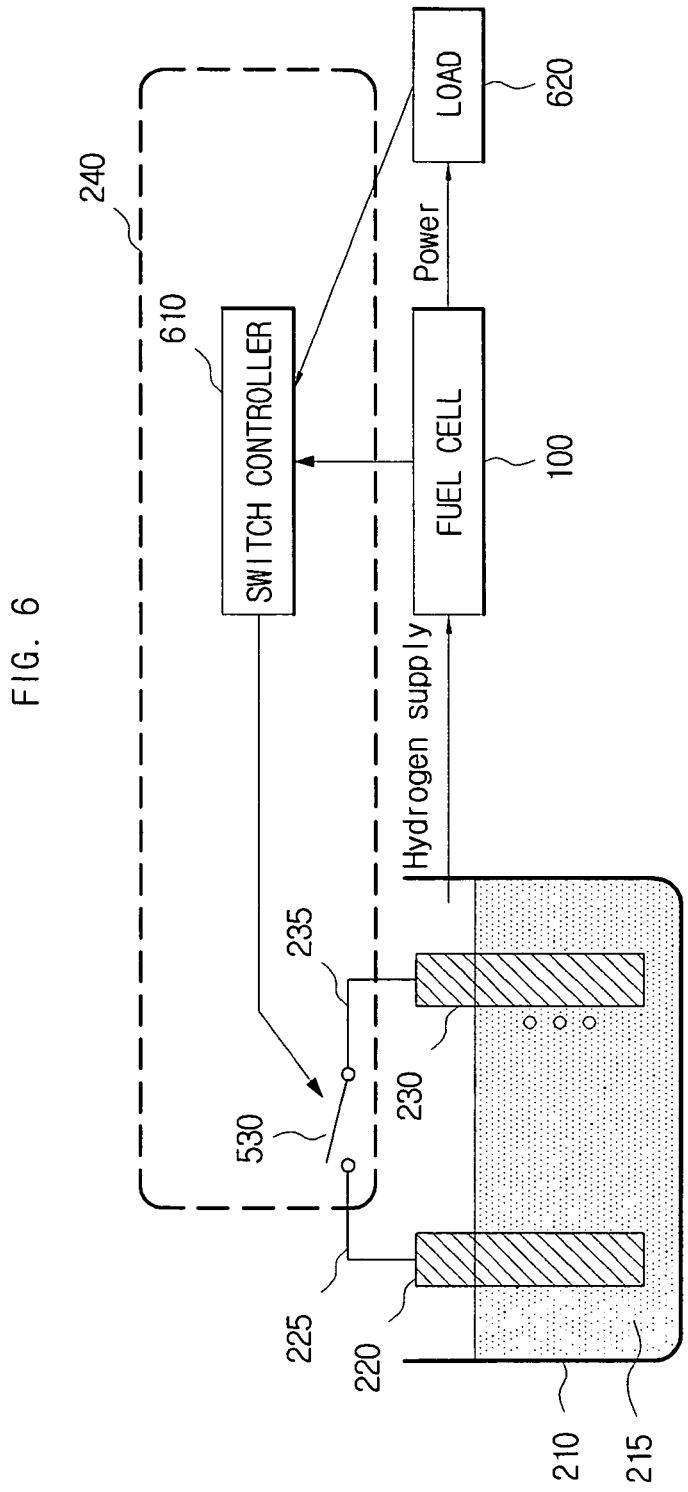
FIG. 6 shows a block diagram of a fuel cell power generation system in accordance with another embodiment of the present invention.

FIG. 6 is a fuel cell power generation system comprising controller 240 of hydrogen generating apparatus 200, fuel cell coupled thereto, and a load in accordance with another embodiment of the present invention.

The control unit 240 includes a switch controller 610 and a switch 530. Here, the switch controller 610 and the switch 530 function the same way as described earlier with reference to FIG. 5, and thus their description will be omitted.

The switch controller 610 is coupled to the load 620 to where the fuel cell 100 provides power to. As described above, load 620 demands different power depending on the currently-working condition (with reference to FIG. 3). Therefore the switch controller 610 receives a demanded power for the currently-working condition of load 620.

And, the switch controller 610 is coupled to the fuel cell 100 to receive an output of the fuel cell 100. The output of fuel cell 100 is, for example, power being provided to the load 620 by the fuel cell 100 that receives hydrogen from the hydrogen generating apparatus 200. As described above, in order to use the hydrogen generating apparatus 200 in accordance with the present invention by coupling to a fuel cell, a certain amount of hydrogen generation, not a total quantity of hydrogen generation, should be maintained, and thus electric power of the fuel cell 100 based on the amount of hydrogen generation is received in units of watt (W). In addition switch controller 610 measures voltage of fuel cell 100 and converts into electric power by use of resistance. Of course, it is possible to use other measurement units as long as the unit is capable of measuring the electric power.

The switch controller 610 compares the output of fuel cell 100 with the demanded power of load 620. In case the output of fuel cell 100 is smaller than the demanded power, the switch controller 610 changes on/off time of switch 530 to increase the amount of hydrogen generation, and in case the output of fuel cell 100 is greater than the demanded power, the switch controller 610 changes on/off time of switch 520 to reduce the amount of hydrogen generation. In case the output of fuel cell 100 is within a certain error range compared with the demanded power, current amount of hydrogen generation is maintained. It is assumed that this switching operation is made by a switch control signal enabling the switch controller 610 to set on/off time of the switch 530.

Figure 7:
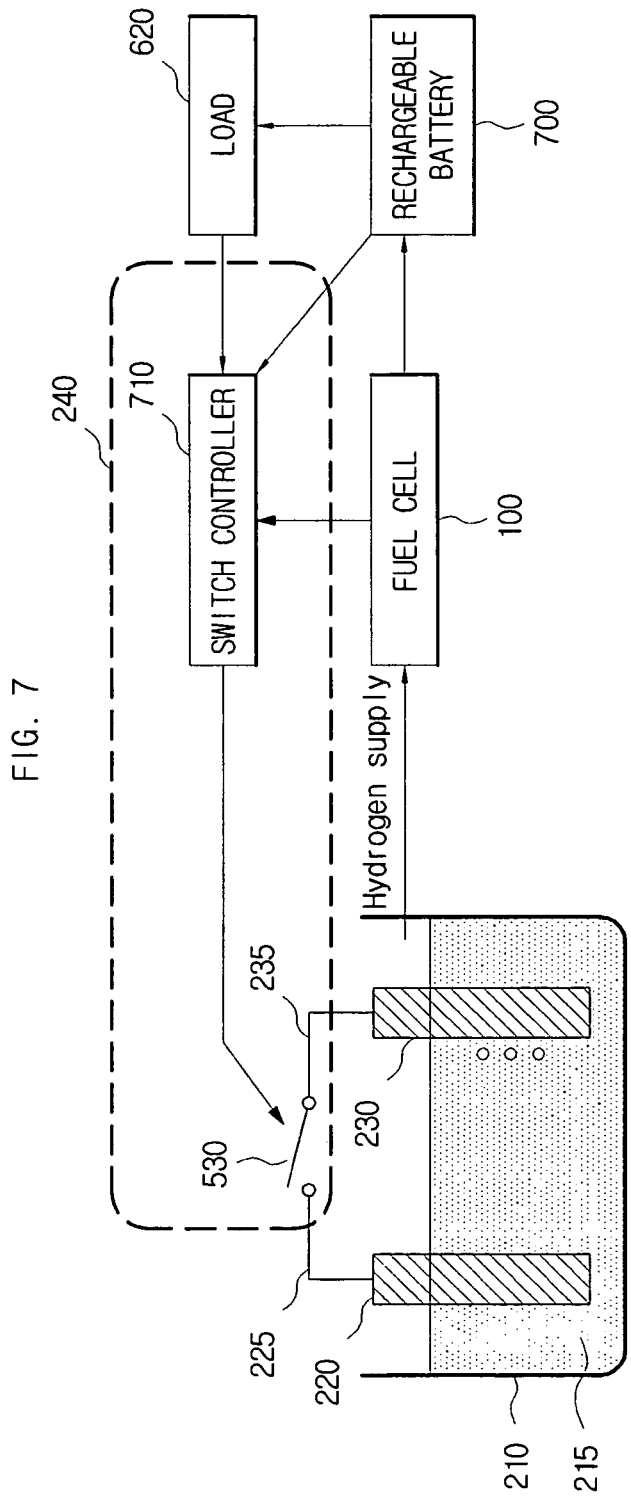
FIG. 7 is a block diagram of a fuel cell power generation system in accordance with another embodiment of the present invention.

FIG. 7 is a fuel cell power generation system comprising controller 240 of hydrogen generating apparatus 200, fuel cell coupled thereto, and a load in accordance with still another embodiment of the present invention.

The control unit 240 includes a switch controller 710 and a switch 530. Here, the switch 530 functions the same way as described earlier with reference to FIG. 5, and thus repetitive description will be omitted.

When compared with the fuel cell power generation system as shown in FIG. 6, the fuel cell power generation system in FIG. 7 further comprises a rechargeable battery 700. Since fuel cell has slow responsiveness, it is not possible to instantaneously respond to a peak power from the load 620. Thus it becomes possible to respond to peak power by charging the rechargeable battery 700 in advance.

The switch controller 710 measures voltage of rechargeable battery 700 to continuously generate hydrogen for the rechargeable battery 700 to be fully charged and for fuel cell 100 to keep providing voltage.

And the switch controller 710 provides the charged voltage of rechargeable battery 700, and thus in case the voltage of rechargeable battery 700 drops, makes the hydrogen generating apparatus 200 to generate hydrogen.

Namely, the switch controller 710 compares present voltage of the rechargeable battery 700 with fully-charged voltage. The fully-charged voltage means the voltage at when the rechargeable battery 700 is fully charged. In case the present voltage is smaller than the fully-charged voltage, then on/off time of switch 530 is changed to increase the amount of hydrogen generation, and in case the present voltage is equal to or greater than the fully-charged voltage, then on/off time of switch 530 is changed to stop hydrogen generation. It is assumed that this switching operation is made by a switch control signal enabling the switch controller 710 to set on/off time of the switch 530.

Here, the rechargeable battery 700 may be a super capacitor or a small rechargeable battery. Super capacitor has the enhanced electric capacity, and can charge and discharge the electric power if necessary.

Figure 8:
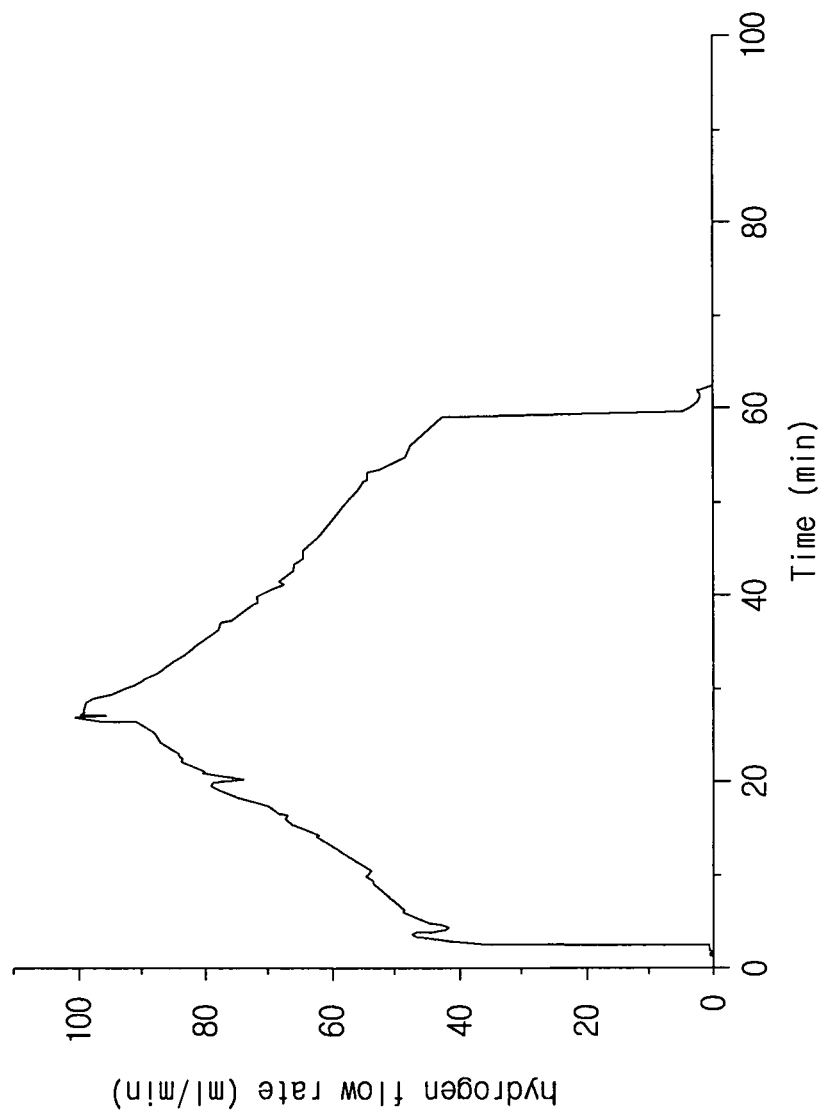

FIG. 8 is a graph of the amount of hydrogen generation, expressed in units of flow rate, when the switch is turned on.

If the switch 530 stays on for a while, the reaction becomes very fast at the beginning, raising the temperature and rapidly increasing the amount of hydrogen generation as much as 100 ml/min. Then, the amount of hydrogen generation quickly drops due to the reduction of water in the aqueous electrolyte solution and the metal composing the first electrode 220.

In such a case, it becomes difficult to control the amount of hydrogen generation, and thus the amount of hydrogen generation is controlled to a desired flow rate by having the switch controller 520 control the turning on/off of the switch 530 such that the switch 530 has a certain duty ratio and/or on/off frequency. This will be further described with reference to FIG. 9.

Figure 9:
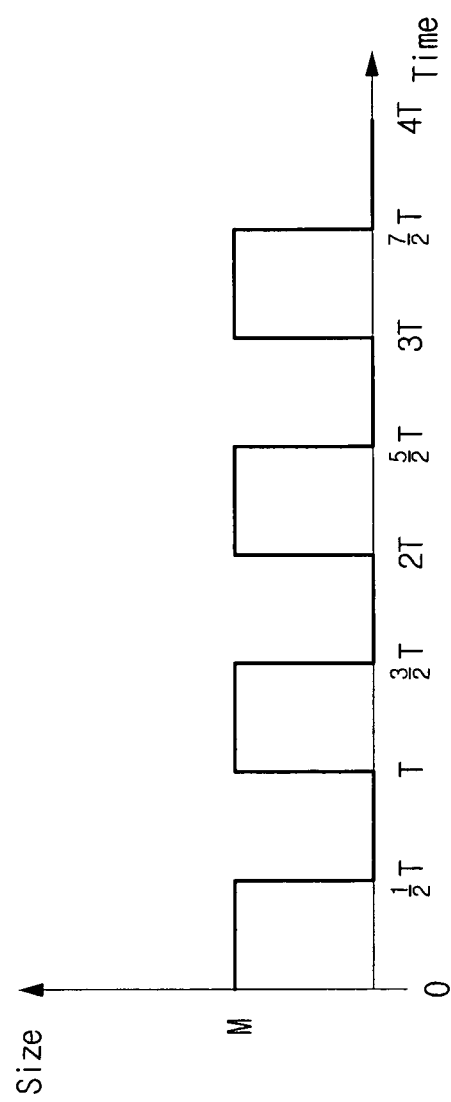
FIG. 9 shows a first example of the on/off frequency of the switch of a hydrogen generating apparatus in accordance with an embodiment of the present invention.
Figure 10:
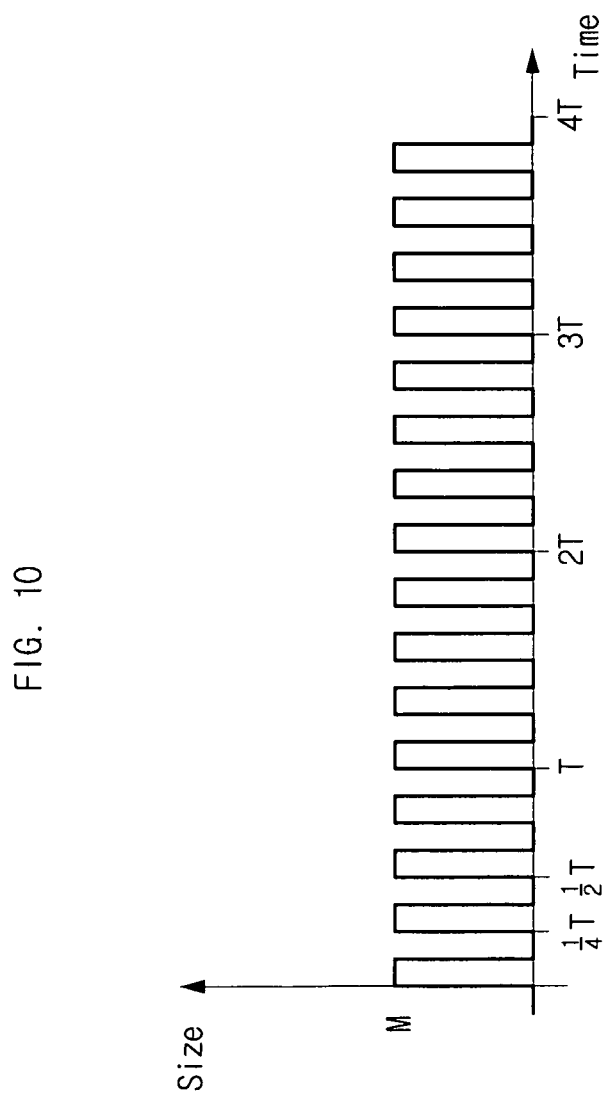
FIG. 10 shows a second example of the on/off frequency of the switch of a hydrogen generating apparatus in accordance with an embodiment of the present invention.
Figure 11:
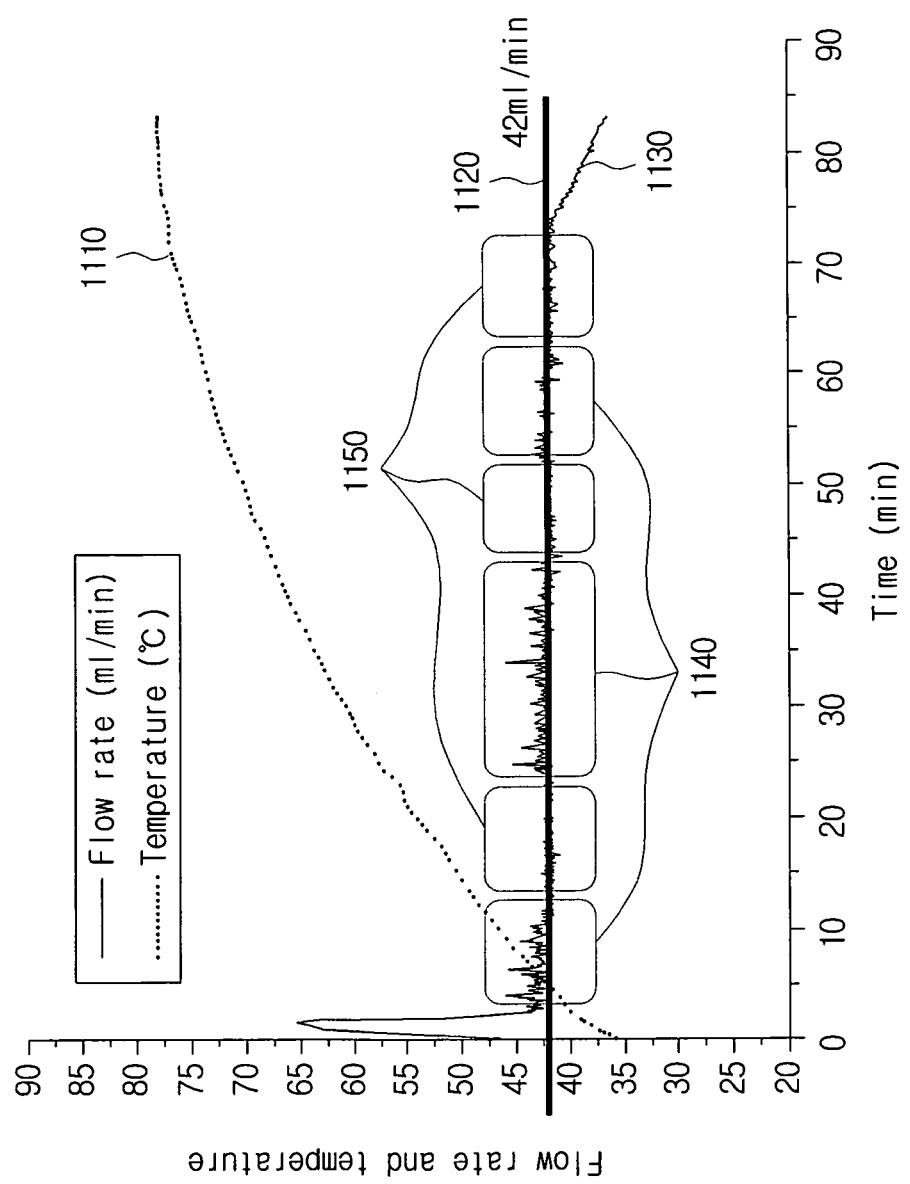
FIG. 11 shows how the amount of hydrogen generation is related to time when the on/off frequency of the switch is controlled.

FIG. 9 is a first example of the on/off frequency of the switch of a hydrogen generating apparatus in accordance with an embodiment of the present invention, and FIG. 10 is a second example of the on/off frequency of the switch of a hydrogen generating apparatus in accordance with an embodiment of the present invention. Furthermore, FIG. 11 shows how the amount of hydrogen generation is related to time when the on/off frequency of the switch is controlled. It will be assumed hereinafter that the switch 530 is turned on when the size of an inputted switch control signal is M (i.e., high) and turned off when the size of an inputted switch control signal is 0 (i.e., low).

Referring to FIG. 9, the switch control signal inputted to the switch 530 has a frequency of T and a duty ratio of 50%. In other words, the switch control signal inputted to the switch 530 is high for ½ T and low for ½ T.

Referring to FIG. 10, on the other hand, the switch control signal inputted to the switch 530 has a frequency of ¼ T and a duty ratio of 50%. In other words, the switch control signal inputted to the switch 530 is high for ⅛ T and low for ⅛ T.

The switch control signal inputted to the switch 530 has a duty ratio (e.g., 50% in the case of FIGS. 9 and 10), and thus the switch 530 is turned on and off for the same duration within one cycle.

Referring to FIG. 11, when the duty ratio of the switch 530 is controlled such that 42 ml/min of hydrogen is generated for a fuel cell that requires 2 W of electric power, there is fluctuation in the amount of hydrogen generation according to the on/off frequency. The temperature 1110 of the hydrogen generating apparatus 200 increases steadily but stays below 80° C.

The amount of hydrogen generation 1120 is close to 42 ml/min. When the on/off frequency is relatively small (i.e., a large cycle) as in FIG. 9, the fluctuation is strong, as shown in boxes represented by 1140. When the on/off frequency is relatively large (i.e., a small cycle) as in FIG. 10, the fluctuation is weak, as shown in boxes represented by 1150.

Therefore, for the same duty ratio, a relatively larger on/off frequency of the switch control signal causes less fluctuation and is easier to maintain the desired amount of hydrogen generation.

Figure 12:
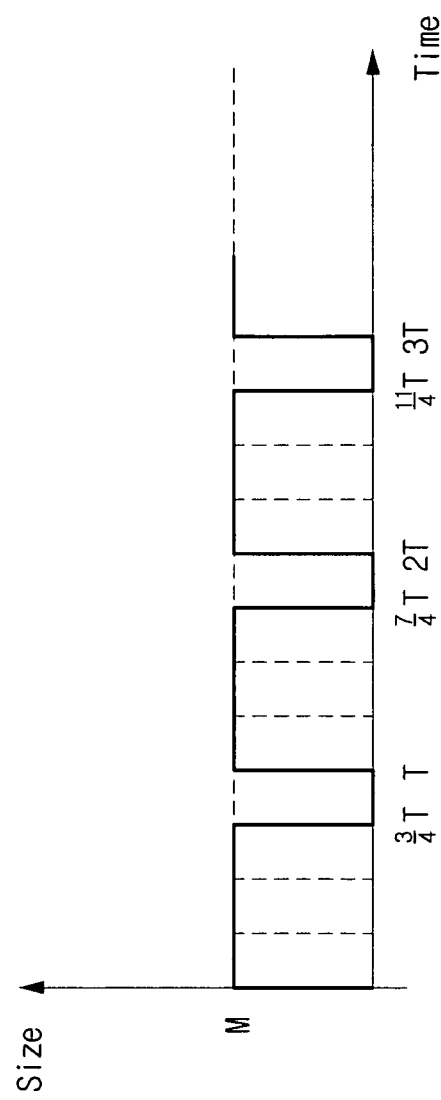
FIG. 12 shows a first example of duty ratios of the switch of a hydrogen generating apparatus in accordance with an embodiment of the present invention.
Figure 13:
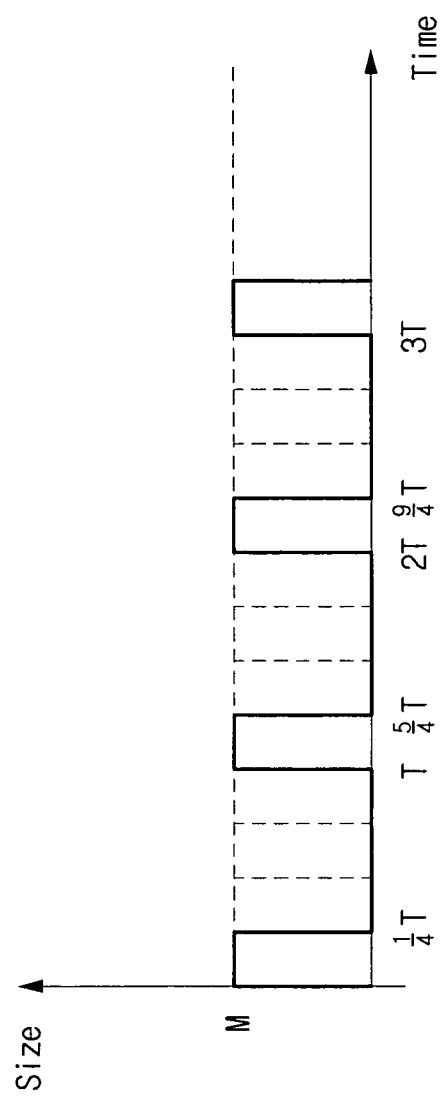
FIG. 13 shows a second example of duty ratios of the switch of a hydrogen generating apparatus in accordance with an embodiment of the present invention.
Figure 14:
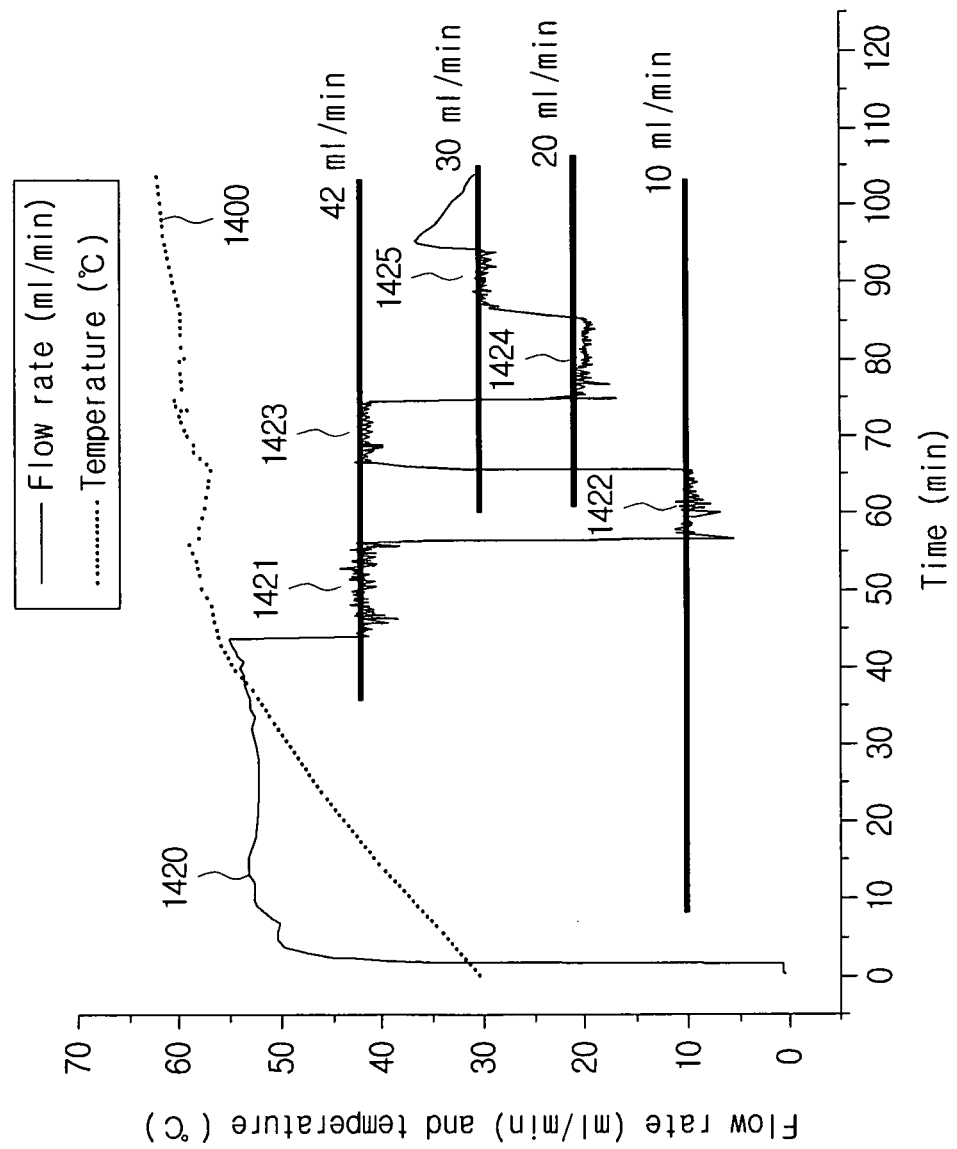
FIG. 14 shows how the quantity of hydrogen generation is related to time when the duty ratio of the switch is controlled.

FIG. 12 is a first example of duty ratios of the switch of a hydrogen generating apparatus in accordance with an embodiment of the present invention, and FIG. 13 is a second example of duty ratios of the switch of a hydrogen generating apparatus in accordance with an embodiment of the present invention. FIG. 14 shows how the quantity of hydrogen generation is related to time when the duty ratio of the switch is controlled.

Referring to FIG. 12, the switch control signal has a cycle of T and a duty ratio of 75%, that is, the switch control signal is high for ¾ T and low for ¼ T.

Referring to FIG. 13, the switch control signal has a cycle of T, which is the same as that of FIG. 12, and a duty ratio of 25%, that is, the switch control signal is high for ¼ T and low for ¾ T.

By controlling the duty ratio of the switch control signal that is inputted to the switch 530, it becomes possible to control the amount of hydrogen generation per time that is generated in the hydrogen generating apparatus 200.

Referring to FIG. 14, the amount of hydrogen generation is left to increase naturally at the beginning (refer to the portion of graph represented by 1420), and then the switch controller 520 controls the on and off of the switch 530 to generate 42 ml/min (1421), 10 ml/min (1422), 42 ml/min (1423), 20 ml/min (1424) and 30 ml/min (1425) of hydrogen.

When the amount of hydrogen generation is adjusted from 42 ml/min (1421) to 10 ml/min (1422), the ratio of off-time of the switch control signal within one cycle is increased, that is, the duty ratio is gradually decreased. Then, by steadily maintaining the duty ratio when the flow rate meter 510 reads 10 ml/min of hydrogen generation, the amount of hydrogen generation is kept at 10 ml/min.

When the amount of hydrogen generation is adjusted from 10 ml/min (1422) to 42 ml/min (1423), the ratio of on-time of the switch control signal within one cycle is increased, that is, the duty ratio is gradually increased. Then, by steadily maintaining the duty ratio when the flow rate meter 510 reads 42 ml/min of hydrogen generation, the amount of hydrogen generation is kept at 42 ml/min.

By repeatedly performing the above adjustment of duty ratio, the switch controller 520 can adjust the amount of hydrogen generation according to changing set values.

As described with reference to FIGS. 9 to 11, it is possible to control the fluctuation in the amount of hydrogen generation by changing the on/off frequency of the switch 530 in case a certain amount of hydrogen generation is maintained.

Moreover, the amount of hydrogen generation measured in units of flow rate in FIGS. 8, 11 and 14 may be the amount of electric power outputted from the fuel cell 100 in a hydrogen generating apparatus 200 shown in FIG. 7. For example, the flow rate of 42 ml/min shown in FIGS. 8, 11 and 14 can correspond to 2 W, depending on the operation condition of the fuel cell 100.

In other words, the earlier-measured amounts of hydrogen generation correspond to the output of the fuel cell (i.e., electric power or voltage) that is measured by the switch controller 610, 710 as shown in FIG. 6 or 7. The amount of hydrogen generation to be controlled through the on/off control of the switch corresponds to the output of the fuel cell, that is, electric power or voltage.

The switch of the hydrogen generating apparatus in accordance with an embodiment of the present invention can be made of an MOS (metal-oxide semiconductor) transistor.

The switch controller of the hydrogen generating apparatus in accordance with an embodiment of the present invention can use a power circuit of the fuel cell and be included in a control unit of a fuel cell power generation system. In other words, by including the switch controller in the control unit of a fuel cell power generation system, the switch controller and the control unit of the fuel cell power generation system can be made into one chip.

Moreover, the hydrogen generating apparatus of the present invention can compose a fuel cell power generation system by being connected to a fuel cell. The fuel cell power generation system includes a hydrogen generating apparatus that is possible to control the amount of hydrogen generation and a fuel cell that generates electricity by being supplied with hydrogen from the hydrogen generating apparatus.

Figure 15:
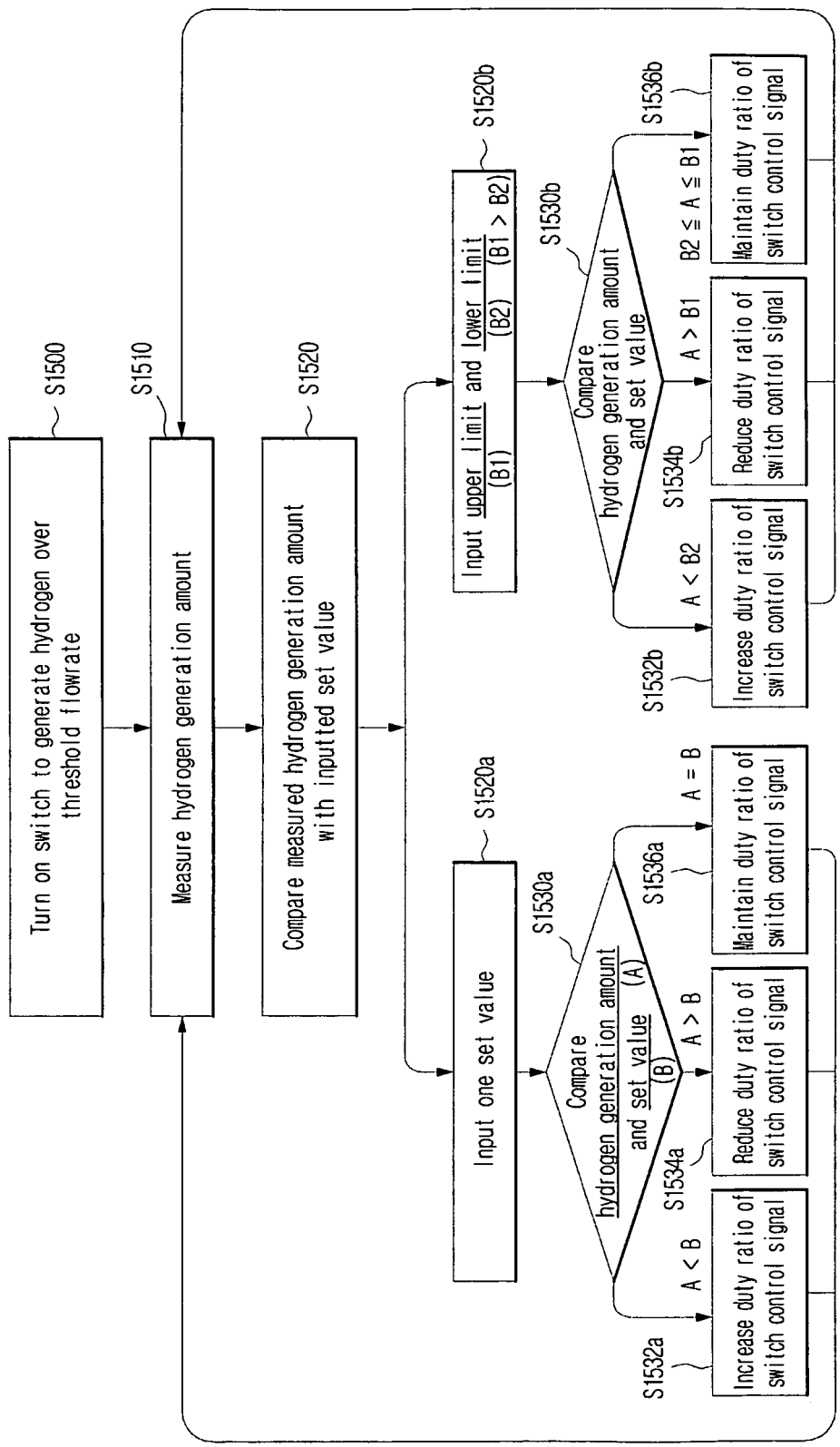
FIG. 15 shows a flowchart of a method of controlling the quantity of hydrogen generation in a hydrogen generating apparatus in accordance with an embodiment of the present invention.

FIG. 15 is a flowchart showing a method of controlling the amount of hydrogen generation in a hydrogen generating apparatus in accordance with an embodiment of the present invention. The hydrogen generating apparatus of FIG. 15 is illustrated in FIG. 5.

The switch controller 520 of the hydrogen generating apparatus 200 turns on the switch 530 and generates hydrogen over a certain threshold of flow rate, in the step represented by S1500.

In step S1510, the flow rate meter 510 measures the amount of hydrogen generation, and in step S1520 the switch controller 520 compares the amount of hydrogen generation, measured by the flow rate meter 510, with an inputted set value. Here, the inputted set value can be one value, as shown in step S1520*a*, or have an upper limit and a lower limit with a range, as shown in step 1520*b*.

The switch controller 520 generates a switch control signal for controlling the on/off of the switch according to the set value and applies the switch control signal to the switch 530.

If one set value is inputted, as shown in step S1520*a*, the amount of hydrogen generation (A) and the set value (B) are compared in step S1530*a*. In case the amount of hydrogen generation is smaller than the set value (A<B), the duty ratio of the switch control signal is increased in step S1532*a*, and if the amount of hydrogen generation is greater than the set value (A>B), the duty ratio of the switch control signal is reduced in step S1534*a*. If the amount of hydrogen generation is equal to the set value (A=B), the current duty ratio of the switch control signal is maintained, in step S1536*a*.

In case the upper limit and the lower limit are inputted in step S1520*b*, the amount of hydrogen generation (A), the upper limit (B1) and the lower limit (B2) are compared in step S1530*b*. If the amount of hydrogen generation is smaller than the lower limit (A<B2), the duty ratio of the switch control signal is increased in step S1532*b*, and if the amount of hydrogen generation is greater than the upper limit (A>B1), the duty ratio of the switch control signal is reduced in step S1534*b*. If the amount of hydrogen generation is between the upper limit and the lower limit (B2≤A≤B1), the current duty ratio of the switch control signal is maintained in S1536*b*.

By repeating steps S1520 to S1536a or S1536b, the hydrogen generating apparatus 200 can generate the amount of hydrogen according to the inputted set value.

Figure 16:
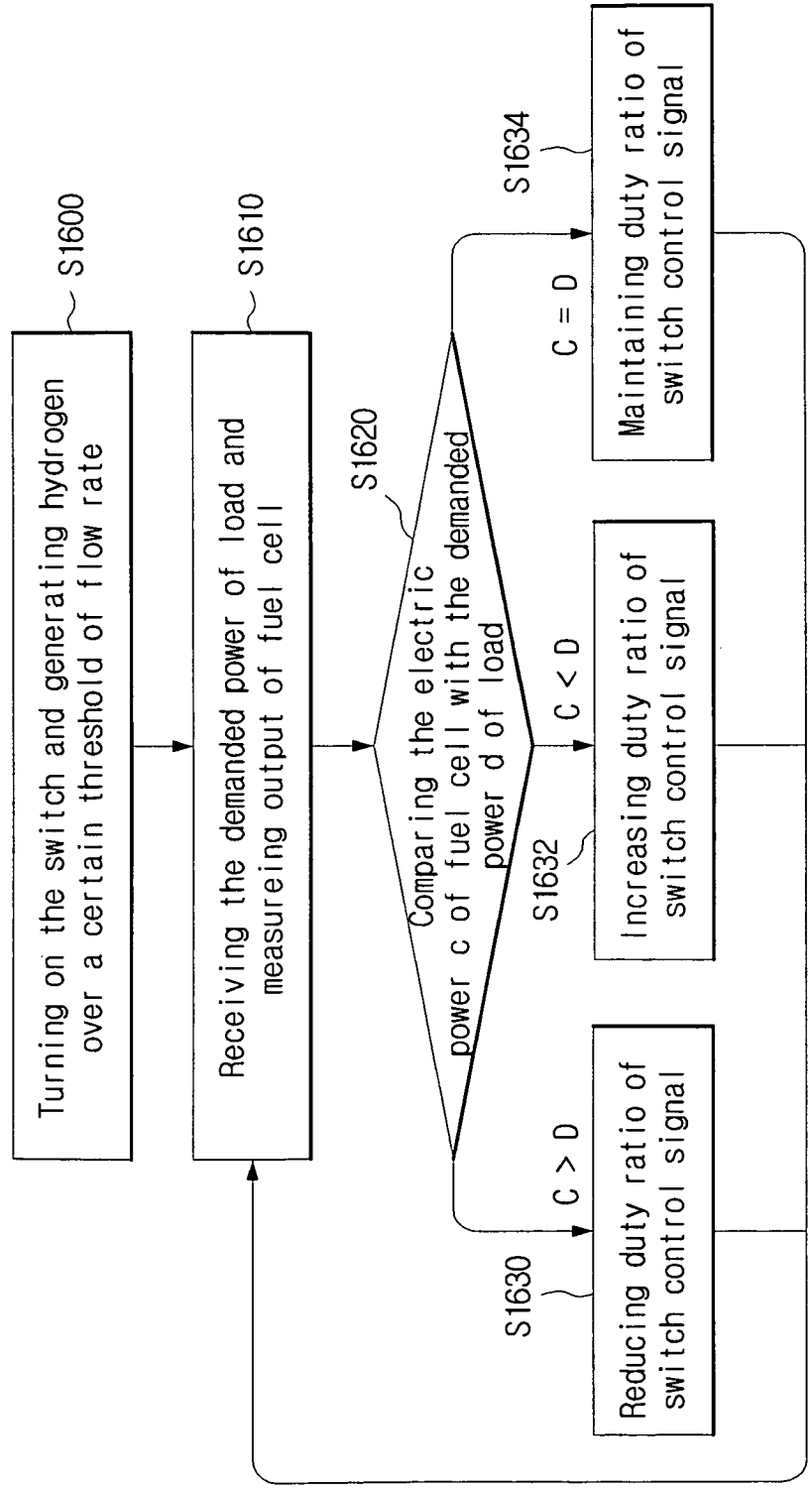
FIG. 16 shows a flowchart of a method of controlling the quantity of hydrogen generation in a hydrogen generating apparatus in accordance with another embodiment of the present invention.

FIG. 16 is a flowchart showing a method of controlling the amount of hydrogen generation in a hydrogen generating apparatus in accordance with another embodiment of the present invention. The hydrogen generating apparatus of FIG. 16 is illustrated in FIG. 6.

The switch controller 610 of the hydrogen generating apparatus 200 turns on the switch 530 and generates hydrogen over a certain threshold of flow rate, in the step represented by S1600.

The switch controller 610 measures output of fuel cell connected to the hydrogen generating apparatus 200, and receives the demanded power of load 620 connected to the fuel cell 100, in the step represented by S1610. Here, the output of fuel cell 100 may be one of electric power or voltage, and in case of voltage, electric power can be calculated by the use of resistance.

And, the switch controller 610 compares the electric power C of fuel cell 100 with the demanded power D of load 620 at step S1620.

According to the comparison, in case the electric power of fuel cell 100 is greater than the demanded power (C>D), the duty ratio of switch control signal is reduced at step S1630, in case the electric power of fuel cell 100 is smaller than the demanded power (C<D), the duty ratio of switch control signal is increased at step S1632, and in case the electric power of fuel cell 100 is equal to the demanded power (C=D), the duty ratio of switch control signal is maintained at step S1634. Here, "equal to" means that the electric power of fuel cell 100 falls within the predetermined error range based on the demanded power.

Then, by repeating steps S1610 to S1630, S1632 or S1634, the hydrogen generating apparatus 200 can control the amount of hydrogen generation for the fuel cell to provide output corresponding to the demanded power of load.

FIG. 17 is a flowchart of a method of controlling the quantity of hydrogen generation in a hydrogen generating apparatus in accordance with another embodiment of the present invention. The hydrogen generating apparatus of FIG. 17 is illustrated in FIG. 7.

By turning on the switch 530 to generate hydrogen over a certain threshold of flow rate, the switch controller 710 of the hydrogen generating apparatus 200 operates the fuel cell 100 and charges the rechargeable battery 700 being connected between the fuel cell 100 and the load 620 in the step represented by S1700.

The switch controller 710 measures the voltage of rechargeable battery 700 at step S1710, and compares the fully-charged voltage F of the rechargeable battery 700 with the present voltage E at step S1720.

According to the comparison, in case the present voltage is equal to or greater than the fully-charged voltage (E≥F), the switch controller 710 minimizes the duty ratio of switch control signal (including 0%) to prevent the rechargeable battery 700 from being charged at step S1730, and in case the present voltage is smaller than the fully-charged voltage (E<F), the switch controller 710 increases the duty ratio of switch control signal at step S1732. Here, "equal to" means that the present voltage falls within the predetermined error range based on the fully-charged voltage.

Then, by repeating steps S1710 to S1730, or S1732 the hydrogen generating apparatus 200 can control the rechargeable battery 700 to be fully charged for being prepared to the peak power demanded from the load 620.

In the above method of controlling the amount of hydrogen generation, steps S1520 to S1536a or S1536b, or steps S1620 to S1630 or S1632, or steps S1720 to S1730 or S1732 can be written in a computer program. Codes and code segments, composing the program, can be easily realized by a computer programmer skilled in the art. Moreover, the program is stored in a computer readable medium, and realizes the method of controlling the amount of hydrogen generation by being read and run by a computer. The computer readable medium described above includes a magnetic recording medium, an optical recording medium and a carrier wave medium.

The drawings and detailed description are only examples of the present invention, serve only for describing the present invention and by no means limit or restrict the spirit and scope of the present invention. Thus, any person of ordinary skill in the art shall understand that a large number of permutations and other equivalent embodiments are possible. The true scope of the present invention must be defined only by the ideas of the appended claims.

What is claimed is:

1. A hydrogen generating apparatus comprising:
an electrolyzer, filled with an aqueous electrolyte solution;
a first electrode, accommodated in the electrolyzer, submerged in the aqueous electrolyte solution, and generating electrons;
a second electrode, accommodated in the electrolyzer, submerged in the aqueous electrolyte solution, receiving the electrons to generate hydrogen;
a switch, located between the first electrode and the second electrode;
a flow rate meter, measuring an amount of hydrogen generation in the second electrode; and
a switch controller, receiving a set value, comparing the amount of hydrogen generation measured by the flow rate meter with the set value, and controlling an on/off status of the switch,
wherein the switch controller generates and outputs a switch control signal turning the switch on and off, and
wherein the switch controller is programmed to determine an on/off ratio of the switch within one cycle by varying a duty ratio of the switch control signal, control a fluctuation in the amount of hydrogen generation by varying an on/off frequency of the switch control signal, compare the set value with the measured amount of hydrogen generation, increase the duty ratio if the amount of hydrogen generation is smaller than the set value, reduce the duty ratio if the amount of hydrogen generation is greater than the set value, and maintain the duty ratio if the amount of hydrogen generation is equal to the set value.

2. The apparatus of claim 1, in which the switch controller is inputted with the set value directly from a user through an input device.

3. The apparatus of claim 1, in which the hydrogen generating apparatus is coupled to a fuel cell and supplies hydrogen,
and the switch controller is inputted with the set value in accordance with an amount of hydrogen generation that is required by the fuel cell.

4. The apparatus of claim 1, in which a metal forming the first electrode has a higher ionization tendency than a metal forming the second electrode.

5. The apparatus of claim 1, in which the flow rate meter measures the amount of hydrogen generation in units of flow-rate.

6. The apparatus of claim 1, in which the set value comprises an upper limit and a lower limit, and the switch controller compares the set value with the measured amount of hydrogen generation, and increase the duty ratio if the amount of hydrogen generation is smaller than the lower limit, reduce the duty ratio if the amount of hydrogen generation is greater than the upper limit, and maintain the duty ratio if the amount of hydrogen generation is between the lower limit and the upper limit.

* * * * *